United States Patent
Proteau et al.

(10) Patent No.: US 7,184,588 B2
(45) Date of Patent: Feb. 27, 2007

(54) SYSTEM AND METHOD FOR MINIMIZING DISPLAY IMAGE SIZE BY APPROXIMATING PIXEL DISPLAY ATTRIBUTES

(75) Inventors: Stephen P. Proteau, Bothell, WA (US); Jingyang Xu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 790 days.

(21) Appl. No.: 10/600,670

(22) Filed: Jun. 19, 2003

(65) Prior Publication Data

US 2004/0258300 A1 Dec. 23, 2004

(51) Int. Cl.
*G06K 9/00* (2006.01)

(52) U.S. Cl. .................. 382/162; 382/167; 382/172; 345/581

(58) Field of Classification Search ............... 382/162, 382/164, 165, 166, 167, 170, 171, 172; 345/426, 345/474, 621, 581; 358/1.9, 518–523
See application file for complete search history.

(56) References Cited

U.S. PATENT DOCUMENTS

| | | | | |
|---|---|---|---|---|
| 5,345,541 A | * | 9/1994 | Kelley et al. | ............... 345/426 |
| 2004/0001062 A1 | * | 1/2004 | Pharr | ......................... 345/426 |
| 2004/0239681 A1 | * | 12/2004 | Robotham et al. | .......... 345/581 |

* cited by examiner

*Primary Examiner*—Jingge Wu
*Assistant Examiner*—Ali Bayat
(74) *Attorney, Agent, or Firm*—Christensen O'Connor Johnson Kindness PLLC

(57) ABSTRACT

A method and structure for approximating pixel display characteristics for complex displays having overlapping images is provided. Each image in the complex display corresponds to a specification of pixel color values and transparency values. Based on a format defining the number of data bits utilized to define the pixel color and pixel transparency values, each pixel's color value is approximated by mapping to a selective color palette. Depending on the format for the transparency values, each pixel's original transparency value or a mapping to a selective transparency palette is appended to the color value data. The color value and transparency values are used to recreate the complex display without requiring the original image to be reproduced.

26 Claims, 13 Drawing Sheets

SYSTEM AND METHOD FOR MINIMIZING DISPLAY IMAGE SIZE BY APPROXIMATING PIXEL DISPLAY ATTRIBUTES

FIELD OF THE INVENTION

In general, the present invention relates to computer software, and in particular, to a system and method for approximating pixel display attributes including pixel color and transparency.

BACKGROUND OF THE INVENTION

Generally described, computing devices can be utilized to display images to computer users on a display screen. To generate various images, the typical computer display is made up of a grid of equal-sized blocks generally referred to as pixels. For example, a display screen may be made up of a grid of 1024 pixels in width and 820 pixels in height. To generate color images on the display, each pixel within the display screen can be individually controlled by a computer such that each pixel can be given a unique color. Further, overall image appearance can be enhanced by various display attributes, such as image opaqueness or transparency. Accordingly, one skilled in the relevant art will appreciate that the quality of displayed color images depends greatly on the number of pixels in the display screen (e.g., resolution), the palette of colors available for each pixel, and the availability of other display attributes.

In one common embodiment, a pixel color is achieved by combining red, green and blue characteristics to generate a particular color. More specifically, each pixel is assigned a particular red value, green value and blue value, which are generated by the display screen to form a resulting color for the pixel. The specification of the three-color value is typically referred to as the red, green and blue value, or RGB value, of the pixel. One skilled in the relevant art will appreciate that the number of potential red, green and blue values for a pixel is dependent entirely on the amount of data utilized to specify the data. For example, in a binary representation, if 8 bits are used to represent each color value in a binary representation (e.g., 8-bit red value, 8-bit green value, and 8-bit blue value), there would be would be $2^8$, or 256, possibilities for each color value. Based on an 8-bit representation, there would be more than 16 million possible RGB combinations (256 red×256 green×256 blue). Accordingly, screen display color resolution benefit greatly, in terms of total possible colors, from representing pixel color attributes utilizing at least 8 bits per color value.

In another embodiment, more complex computer displays can be generated from the use of overlapping images within the same display. By associating transparency properties to the images in the display, portions of an underlying image (e.g., the destination image) may be at least partially visible through an overlying image or set of images (e.g., the source image). For example, a display may be controlled to give the appearance of fading or shadowing by selectively adjusting the transparency attribute of a source image over a given period of time such that portions of a destination image becomes more visible over time. To add transparency to a set of images, each pixel corresponding to the image may be associated with a transparency property value. For example, a semi-transparent transparency property for a pixel will result in the original color of the pixel being displayed that allows some portion of an underlying image to be partially visible. In contrast, the same pixel with an opaque (e.g., no transparency) transparency property will be correspond to the original color of the pixel being displayed in with no transparency properties.

One skilled in the relevant art will appreciate that a computer generates complex displays utilizing overlapping images and transparency properties by rendering the overlapping images utilizing an alpha blending process. Generally described, alpha blending relates to the process to the combination of the transparency attribute values, or alpha values, of a destination image with the alpha values of the source image to generate an overall appearance for each pixel in the display. In accordance with a common alpha blending embodiment, the transparency property of a complex image display is controlled primarily by the alpha value of the source image (e.g., overlying image). Equation (1) defines a typical alpha blending processing equation for defining the overall transparency property of a display pixel in a display having a destination and a source image. In accordance with Equation (1), each image's alpha value is represented as value, such as a decimal between within a range of 0–1, in which a value of 1 indicates opaqueness and a value of 0 indicates translucence.

$$\text{Alpha}_{overall} = (1-\text{Alpha}_{source}) * \text{Alpha}_{desintaion} + \text{Alpha}_{source} \quad (1)$$

To generate complex images, each image defines color values and transparency property values for each pixel of the display. A computer generating the display processes the multiple image color and transparency properties and renders an overall display based on a combination of the images. The rendering of complex displays having multiple images are well-known in the art and will not be described in greater detail.

As illustrated in Equation (1), the alpha property of an image may be specified as a numeric value in a sliding scale of possible transparency values with fully transparent and fully opaque as the endpoints of the scale. In a common embodiment, each pixel can be assigned a transparency property value is represented by an additional data that allows alpha blending on a per pixel basis. In one common embodiment, 8 bits of data are used to represent pixel transparency values providing $2_8$, or 256, possible transparency values for each pixel in the image display. For example, a value of "0" would indicate complete transparency and a value of "255" would indicate complete opaqueness. Because the transparency specification data is in addition to the color value data, in a typical 8-bit representation environment, 32 bits would be required to specify pixel color (e.g., 24 bits) and pixel transparency (e.g., 8 bits).

Although representing pixel color and transparency attributes utilizing 8-bits per color value and for pixel transparency results in improved display images, there are a number of environments in which limited data transfer bandwidth may effect the ability to specify the full range of possible colors. For example, in a communication network environment, such as the Internet, the performance of data delivery, such as the delivery of a Web page, is optimized by limiting the amount of data transmitted over network. In an environment utilizing 8-bit RGB values and 8-bit transparency values, the transfer of 32-bits of data per pixel result in transferring more than 26 million bits of data per page of display for a 1024 by 820 pixel display screen. Further, in addition to the issues related to minimizing data size for transmittal, there are a number of issues related to minimizing data size for storing and processing larger image data. Accordingly, there is an emphasis to improve computer performance by approximating color and transparency data for each pixel with a lesser amount of data while mitigating the potential color degradation associated with the lesser data.

There have been a number of attempts to facilitate image data transmission through the use of compression methodologies, such as the Joint Picture Experts Group (JPEG), Portable Network Graphics (PNG) and the Graphics Interchange Format (GIF) methodologies. Generally described, most common compression methodologies compress original image data utilizing one of a variety of algorithms and then transmit the compressed image data across a communication network. Many image compression formats/methodologies, such as JPEG and GIF, are limited in their ability to process image transparency information. Accordingly, complex image rendering is not feasible for these types of compressed images. Further, in many image formats such as JPEG and PNG, to render the image, a receiving computer must uncompress the processed image data, store the uncompressed image in memory and render the image from the uncompressed image. Thus, these formats only mitigate the strain on image data transmission and are generally inefficient for storing and rendering images on a computer.

Thus, there is a need for an image approximation method that preserves distinctive pixel color and image transparency values, while minimizing the amount of data required to represent the color and transparency information during transmission and in memory.

SUMMARY OF THE INVENTION

A method and structure for approximating pixel display characteristics for complex displays having overlapping images is provided. Each image in the complex display corresponds to a specification of pixel color values and transparency values. Based on a format defining the number of data bits utilized to define the pixel color and pixel transparency values, each pixel's color value is approximated by mapping to a selective color palette. Depending on the format for the transparency values, each pixel's original transparency value or a mapping to a selective transparency palette is appended to the color value data. The color value and transparency values are used to recreate the complex display without requiring the original image to be reproduced.

In accordance with an aspect of the present invention, a method for processing content requests is provided. A computing device obtains a content request including a request for display data corresponding to a specification of color values and transparency values for a plurality of pixels. Each pixel has a specific color value and a specific transparency value. The specific color value and the specific transparency values are defined by a number of bits of data. Additionally, a format for a response to the content requests corresponds to a number of bits of data for color values and a number of bits of data for transparency values; The computing device generates a color palette corresponding to a selection of a subset of pixel color values found in the plurality of pixels within the requested display data. The size of the color palette is determined by the number of bits for color values in the format for the response to the content request. For each pixel in the display, the computing device maps an original pixel color value to a color value in the color palette. If the number of bits defining an original pixel transparency value is less than or equal to the number of bits for transparency values in the format for the response to the content request, The computing devices appends the original transparency values to the mapping of pixel color values for each pixel in the display. The computing device then transmits the color palette and the mapped color values and transparency values in response to the content request.

In accordance with another aspect of the present invention, a method for processing content requests corresponding to complex displays including a plurality of images is provided. At least a portion of the two or more images overlap. In accordance with the method, for each image in a complex display, a computing devices obtains a specification of color values and transparency values for a plurality of pixels in the image. Each pixel has a specific color value and a specific transparency value, each of which are defined by a number of bits of data. The computing device generates a color palette corresponding to a selection of a subset of pixel color values found in the plurality of pixels within the requested display data. The size of the color palette is determined by the number of bits for color values defined in a format for the response to the content request. For each pixel in the display, the computing device maps an original pixel color value to a color value in the color palette. If the number of bits defining an original pixel transparency value is less than or equal to a number of bits for transparency values in a format for the response to the content request, the computing devices appends the original transparency values to the mapping of pixel color values for each pixel in the display. Additionally, the computing device transmits the color palette and the mapped color values and transparency values for each image in the two or more images in response to the content request.

In accordance with a further aspect of the present invention, a computer-readable medium having computer-executable components for approximating pixel display properties is provided. The computer-executable components include a display format component for allocating a number of bits to approximate pixel color values for each pixel in a display and a number of bits to approximate pixel transparency values for each pixel in a display. The computer-executable components also include a plurality of pixel color value components defining a pixel color value for each pixel in the display. The pixel color value in the pixel color value components corresponds to a mapping of an original pixel color value to a color palette. The color palette includes a subset of the original pixel colors in the display. Additionally, the size of the color palette is defined by the number of bits allocated to approximate pixel color. The computer-executable components also include a plurality of transparency value components defining a pixel transparency value for each pixel in the display. The transparency value in the transparency value components corresponds to an original pixel transparency value if the number of bits utilized to define the pixel transparency values is less than or equal to the number of bits defined to approximate pixel transparency.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF AN ILLUSTRATIVE EMBODIMENT

Generally described, the present invention relates to a system and method for approximating pixel color and transparency attributes in displays. More specifically, the present invention relates to a system and method for facilitating the direct rendering of display images from approximated pixel color and transparency values. Although the present invention may be described with regard to illustrative threshold values and/or operating environments, one skilled in the relevant art will appreciate that these embodiments should not be construed as limiting. Prior to discussing the present invention in greater detail, a suitable computing system for implementing the present invention will be described.

Figure 12:
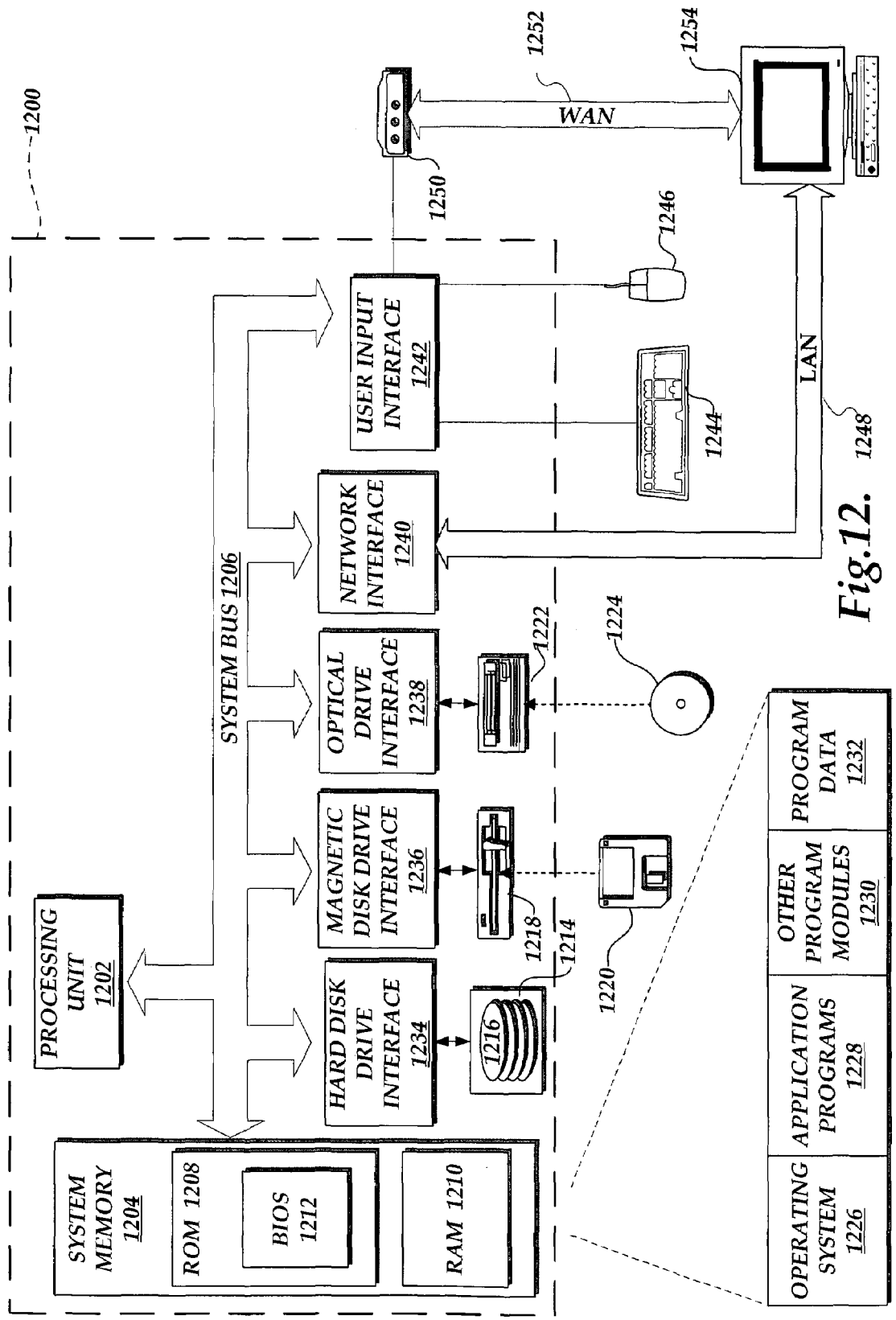
FIG. 12 is a block diagram illustrative of a computer system suitable to implement various aspects of the present invention.

FIG. 12 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependent requirement relating to any one or combination of components illustrated in the exemplary operating environment.

The invention is operational in numerous other general purpose or special computing system environments or configurations. Examples of well known computing systems, environments, and/or configurations that may be suitable for implementing the invention include, but are not limited to, personal computers, server computers, laptop devices, multiprocessor systems, microprocessor-based systems, network PCs, minicomputers, mainframe computers, or distributed computing environments that include any of the above systems or the like.

The invention may be described in the general context of computer-executable instructions, such as program modules, being executed by a computer. Generally, program modules include routines, programs, objects, components, data structures, etc., that perform a particular task or implement particular abstract data types. The invention may be also practiced in distributed computing environments where tasks are performed by remote processing devices that are linked through a communications network. In a distributed computing environment, program modules may be located in both local and remote computer storage media including memory storage devices.

With reference to FIG. 12, an exemplary system for implementing the invention includes a general purpose computing device in the form of a computer 1200. Components of a computer 1200 include, but are not limited to, a processing unit 1202, a system memory 1204, and a system bus 1206 that couples various system components including the system memory to the processor. The system bus may be any of several types of bus structures including a memory bus or memory controller, peripheral bus, and a local bus using any of a variety of bus architectures. By way of example, not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 1200 typically includes a variety of computer-readable media. Computer-readable media can be any available media that can be accessed by the computer 1200 and includes both volatile and non-volatile media, removable and non-removable media. By way of example, and not limitation, computer-readable media may comprise computer storage media and communication media. Computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which can be used to store the desired information and which can be accessed by the computer 1200.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 1204 includes computer storage media in the form of volatile and/or non-volatile memory such as read only memory (ROM) 1208 and random access memory (RAM) 1210. A basic input/output system 1212 (BIOS), containing the basic routines that help to transfer information between elements within the computer 1200, such as during start-up, is typically stored in ROM 1208. RAM 1210 typically contains data and/or program modules that are immediately accessible to and/or presently being operated on by the processing unit 1202. By way of example, and not limitation, FIG. 12 illustrates an operating system 1226, application programs 1228, other program modules 1230, and program data 1232.

The computer 1200 may also include removable/non-removable, volatile/non-volatile computer storage media. By way of example only, FIG. 12 illustrates a hard disk drive 1214 that reads from or writes to non-removable, non-volatile magnetic media 1216, a magnetic drive 1218 that reads from or writes to a removable, non-volatile magnetic disk 1220, and an optical disk drive 1222 that reads from or writes to a removable, non-volatile optical disk 1224, such as CD-ROM, or other optical media. Other removable/non-removable, volatile/non-volatile computer storage media that can be used in the exemplary operating environment include, but are not limited to, magnetic tape cassettes, flash memory cards, DVD, digital video tape, Bernoulli cap cartridges, solid state RAM, solid state ROM, and the like. The hard disk drive 1214, magnetic disk drive 1218, and optical disk drive 1222 may be connected to the system bus 1206 by a hard disk drive interface 1234, a magnetic disk drive interface 1236, and an optical drive interface 1238, respectively. Alternatively, the hard disk drive 1214, magnetic disk drive 1218, and optical disk drive 1222 are typically connected to the system bus 1206 by a Small Computer System Interface (SCSI).

The drives and their associated computer storage media discussed above and illustrated in FIG. 12, provide storage of computer-readable instructions, data structures, program modules and other data for the computer 1200. In FIG. 12, for example, the hard disk drive 1234 is illustrated as storing the operating system 1226, application programs 1228, other programs 1230, and program data 1232. Note that these components can either be the same as or different from the operating system 1226, the other program modules 1230, and the program data 1232. A user may enter commands and information into the computer 1200 through an input device such as a keyboard 1244 and/or a pointing device 1246, commonly referred to as a mouse, track ball or touch pad. Other input devices (not shown) may include a microphone, a joystick, a game pad, a satellite dish, a scanner, or the like. These and other input devices are often connected to the processing unit 1202 through user input interface 1242 and may be connected by other interface and bus structures, such as a parallel port, game port or other universal serial bus (USB).

The computer 1200 may operate in a network environment using logical connections to one or more remote computers 1254. The remote computer 1254 may be a personal computer, a server, a router, a network PC, a peer device or other common network node, and typically includes many or all of the elements described above relative to the computer 1200, although only a memory storage device has been illustrated in FIG. 12. The logical connections depicted in FIG. 12 include a local area network (LAN) 1248 and a wide area network (WAN) 1252, but also include other networks. Such network environments are commonplace in office, enterprise-wide computer networks, Intranets, and the Internet.

When used in a LAN network environment, the computer 1200 is connected to the LAN 1248 through a network interface adapter 1240. When used in a WAN network environment, the computer typically includes a modem 1250 or other means for establishing communications over the WAN 1252, such as the Internet. The modem, which may be internal or external, may be connected to the system bus 1206 via the serial port interface or other appropriate mechanism. In a networked environment, program modules depicted relative to the computer 1200, or portions thereof, may be stored in the remote memory storage device. By way of example, and not limitation, FIG. 12 illustrates remote application programs 1228 as residing on memory device 1204. It will be appreciated that the network connections shown are exemplary and other means of establishing communication between the computers may be used. Although many other internal components of the computer 1200 are not shown, those of ordinary skill will appreciate that such components and their interconnection are well known. Accordingly, additional details concerning the internal construction of the computer 1200 need not be disclosed in connection with the present invention.

Those skilled in the art will understand that program modules such as the operating system 1226, the application programs 1228 and data 1232 are provided to the computer 1200 via one of its memory storage devices, which may include ROM 1208, RAM 1210, hard disk drive 1214, magnetic disk drive 1218, or optical disk device 1222. The hard disk drive 1214 is used to store data 1232 and the programs, including the operating system 1226 and application programs 1228.

When the computer 1200 is turned on or reset, the BIOS 1212, which is stored in ROM 1208 instructs the processing unit 1202 to load the operating system 1226 from the hard disk drive 1214 into the RAM 1210. Once the operating system 1226 is loaded into RAM 1210, the processing unit executes the operating system code and causes the visual elements associated with the user interface of the operating system to be displayed on the monitor. When a user opens an application program 1228, the program code and relevant data are read from the hard disk drive and stored in RAM 1210.

As described above, aspects of the present invention are embodied in a World Wide Web ("WWW") or ("Web") site accessible via the Internet. As is well known to those skilled in the art, the term "Internet" refers to the collection of networks and routers that use the Transmission Control Protocol/Internet Protocol ("TCP/IP") to communicate with one another. In accordance with an illustrative embodiment of the Internet, a plurality of local LANs and a WAN can be interconnected by routers. The routers are special purpose computers used to interface one LAN or WAN to another. Communication links within the LANs may be wireless, twisted wire pair, coaxial cable, or optical fiber, while communication links between networks may utilize 56 Kbps analog telephone lines, 1 Mbps digital T-1 lines, 45 Mbps T-3 lines or other communications links known to those skilled in the art. Furthermore, computers and other related electronic devices can be remotely connected to either the LANs or the WAN via a digital communication device, modem and temporary telephone, or a wireless link.

As is appreciated by those skilled in the art, the WWW is a vast collection of interconnected or "hypertext" documents written in HyperText Markup Language ("HTML"), or other markup languages, that are electronically stored at or dynamically generated by "WWW sites" or "Web sites" throughout the Internet. Additionally, client-side software programs that communicate over the Web using the TCP/IP protocol are part of the WWW, such as JAVA® applets, instant messaging, e-mail, browser plug-ins, Macromedia Flash, chat and others. Other interactive hypertext environments may include proprietary environments such as those provided by a number of online service providers, as well as the "wireless Web" provided by various wireless networking providers, especially those in the cellular phone industry. It will be appreciated that the present invention could apply in any such interactive communication environments, however, for purposes of discussion, the Web is used as an exemplary interactive hypertext environment with regard to the present invention.

A Web site is a server/computer connected to the Internet that has massive storage capabilities for storing hypertext documents and that runs administrative software for handling requests for those stored hypertext documents as well as dynamically generating hypertext documents. Embedded within a hypertext document are a number of hyperlinks, i.e., highlighted portions of text which link the document to another hypertext document possibly stored at a Web site elsewhere on the Internet. Each hyperlink is assigned a Uniform Resource Locator ("URL") that provides the name of the linked document on a server connected to the Internet. Thus, whenever a hypertext document is retrieved from any web server, the document is considered retrieved from the World Wide Web. Known to those skilled in the art, a web server may also include facilities for storing and transmitting application programs, such as application programs written in the JAVA® programming language from Sun Microsystems, for execution on a remote computer. Likewise, a web server may also include facilities for executing scripts and other application programs on the web server itself.

A remote access user may retrieve hypertext documents from the World Wide Web via a web browser program. A web browser, such as Netscape's NAVIGATOR® or Microsoft's Internet Explorer®, is a software application program for providing a user interface to the WWW. Using the web browser via a remote request, the web browser requests the desired hypertext document from the appropriate web server using the URL for the document and the HyperText Transport Protocol ("HTTP"). HTTP is a higher-level protocol than TCP/IP and is designed specifically for the requirements of the WWW. HTTP runs on top of TCP/IP to transfer hypertext documents and user-supplied form data between server and client computers. The WWW browser may also retrieve programs from the web server, such as JAVA applets, for execution on the client computer. Finally, the WWW browser may include optional software components, called plug-ins, that run specialized functionality within the browser.

As described above, the present invention corresponds to the approximation of display images through the approximation of pixel color and image transparency attributes, generally referred to as display attributes. The approximation of display attributes can reduce the data required to transmit and store images. Generally described, the present invention utilizes a process corresponding to the approximation of pixel color data utilizing a color octree and the additional of image transparency information. The resulting data file may be transmitted, stored and rendered without reverting to the original image data. Although the present invention will be described with regard to an 8-bit color palette having 256 unique colors for approximating pixel color attributes and an 8-bit transparency attribute value, the present invention may be applied to any size color palette, transparency data specification, and/or transparency value palette.

Figure 1:
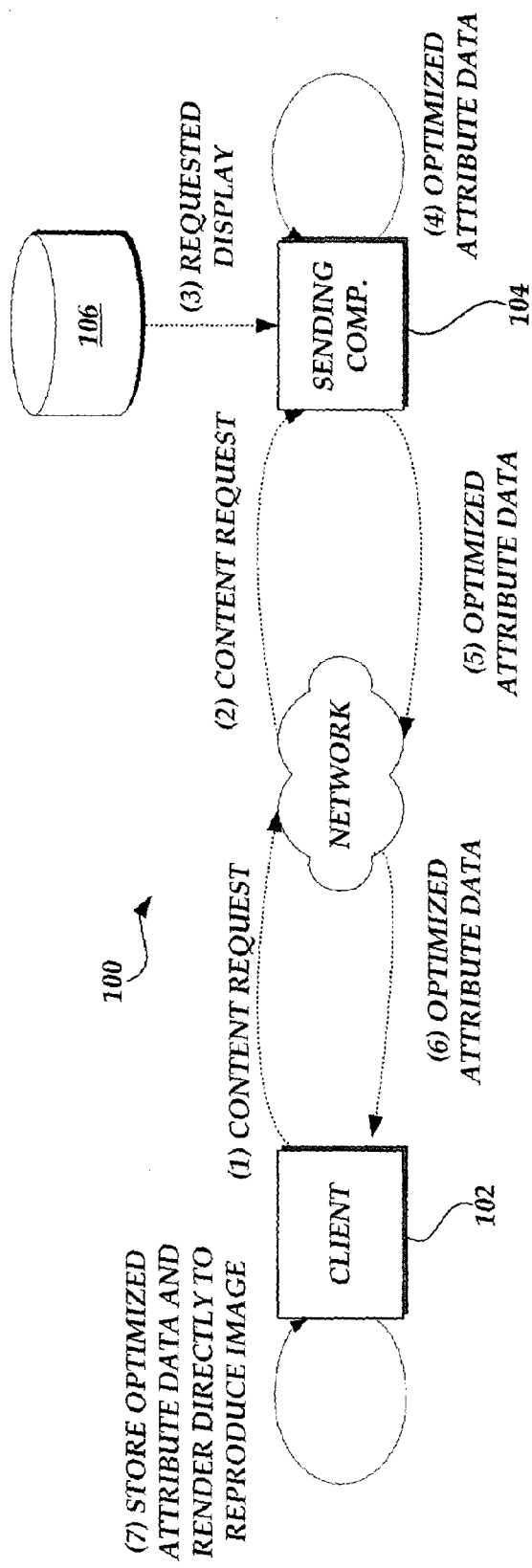
FIG. 1 is a block diagram illustrative of a system for processing content requests utilizing an optimized color palette and transparency palette in accordance with the present invention.

FIG. 1 is a block diagram illustrative of a system 100 for processing images utilizing an optimized color palette and transparency data. As illustrated in FIG. 1, a client computing device 102 requests information from a sending computer 104 over a communication network, such as the Internet. The sending computer 104 identifies and obtains the requested content from memory or a database 106. The sending computer 104 then generates an optimized color palette and transparency information for the display images in the requested content. The sending computer 102 associates each pixel's original color to one of the colors in the optimized color palette and each pixel's transparency value to the transparency palette, if applicable. The sending computer 104 then transmits the color palette, transparency palette and the associated mapping information to the client computing device 102. The client computing device 102 obtains the transmitted data and stores the data in its approximated format. The client computing device 102 then reproduces the requested images according to the optimized color palette and transparency information without returning the image data to its original format.

In an alternative embodiment of the present invention, the client computing device 102 may obtain uncompressed image files with transparency information or compressed image files having transparency information. In this embodiment, the client computing device 102 generates an optimized color palette for the display images and associates each pixel's original color to one of the colors in the optimized color palette. The client computing device 102 appends each pixel's transparency value to the optimized color information. The client computing device 102 can then utilize the resulting information to store the image data with a smaller memory footprint or transmit the data to another receiving computing device.

Figure 2:
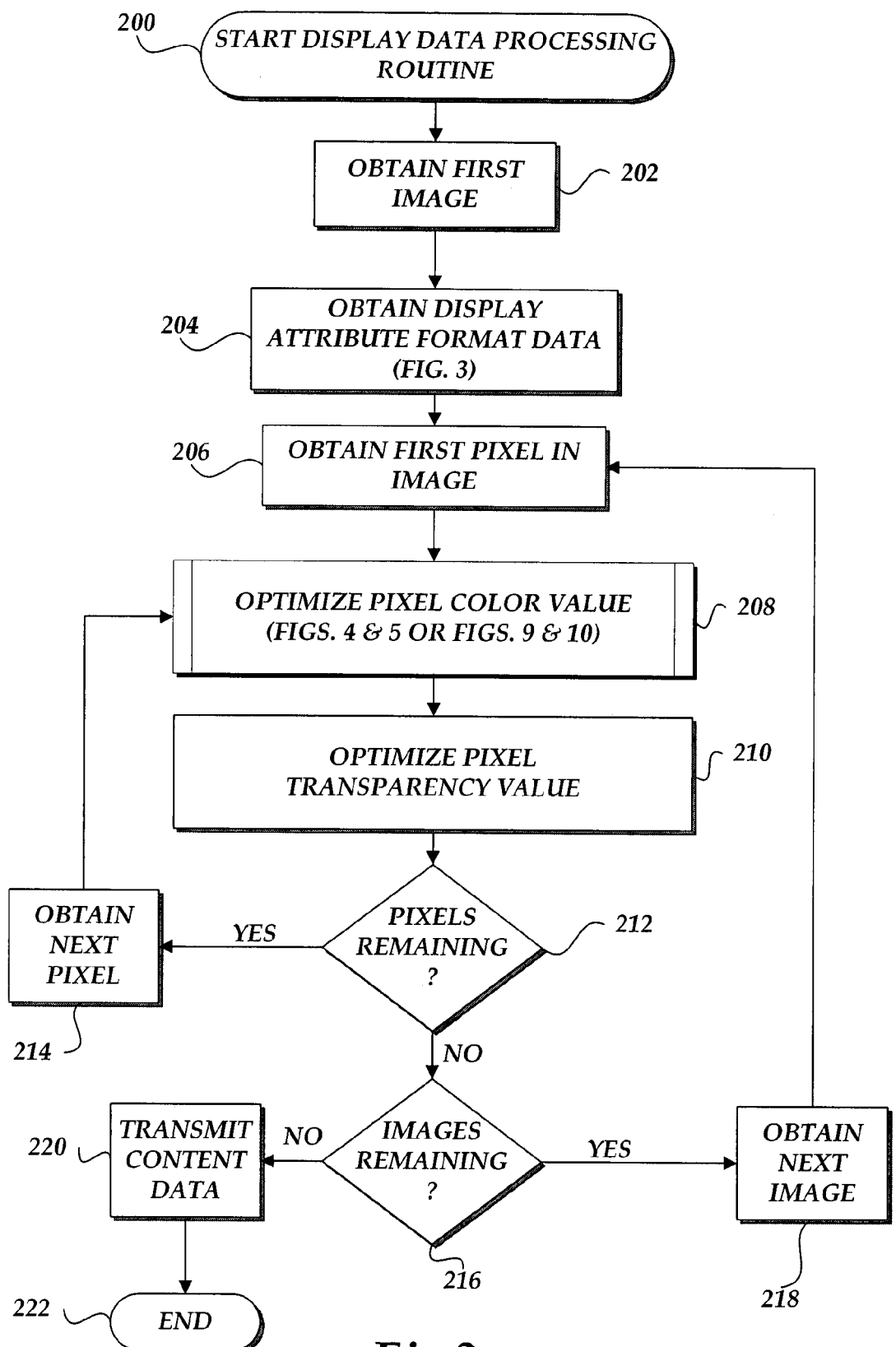
FIG. 2 is a flow diagram illustrative of a display data processing routine for approximating pixel color and transparency data in accordance with the present invention.

FIG. 2 is a flow diagram illustrative of image processing routine 200 utilized to approximate pixel color and transparency attribute values in accordance with the present invention. In accordance with one embodiment of the present invention, routine 200 may be implemented upon the processing of content request corresponding to a request for content. In another embodiment of the present invention, routine 200 may be implemented prior to storing a display image. Still further, routine 200 may be implemented upon receiving an instruction to transmit content to another computing device connected to a communication network, or to another component/application within the same computing device.

Figure 3:
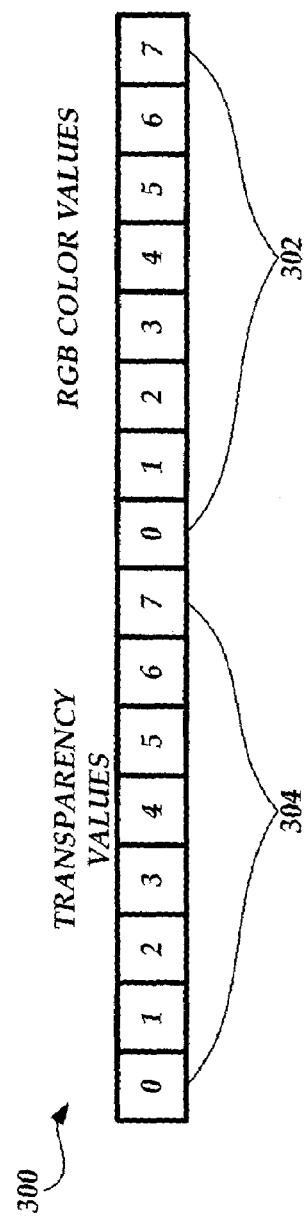
FIG. 3 is a block diagram illustrative of a display data approximation format in accordance with the present invention.

With reference now to FIG. 2, at block 202, the first image in the display is obtained. As described above, complex displays may be generated by rendering multiple images in a single display. In accordance with an illustrative embodiment of the present invention, routine 200 may be used to iteratively process each image within a complex display. Alternatively, routine 200 may be utilized to process a single image or a selection of images within a single display. At block 204, the format for the data approximation is obtained. FIG. 3 is a block diagram illustrative of a format 300 for data approximation. As illustrated in FIG. 3, the format 300 includes a lower portion 302 corresponding to RGB color values for a pixel. The format also includes an upper portion 304 corresponding to transparency values for a pixel. In accordance with an aspect of the present invention, the order of the lower portion 302 for the RGB color values allows the data approximation to be compatible with systems that are not configured to process transparency value data. In such systems, the upper portion 304 for the transparency values may be ignored.

In an illustrative embodiment of the present invention, the number of bits utilized to approximate pixel color values and pixel transparency values may be dynamically calculated. For example, as illustrated in FIG. 3, 8 bits are allocated to define pixel color values and 8 bits are allocated to define pixel transparency values. In an another embodiment, the format may be dynamically determined according to a predefined correlation to the type of images being transmitted, a predefined granularity specified by a user, or other determination criteria. In a further embodiment of the present invention, the format may be predetermined by the processing system or by some user control.

After the format of the data is obtained, routine 200 enters an iterative routine to process each of the pixels within the display. Accordingly, the first pixel is obtained at block 206. At block 208, the color values for the pixel is approximated. In an illustrative embodiment of the present invention, the color value is approximated utilizing a selective color palette formed in accordance with the Gervautz and Purgthofer method. In an alternate embodiment of the present invention, the color value is approximated utilizing an optimized color palette. Examples of approximating data utilizing either the Gervautz and Purgthofer method or an optimized color palette will be described in greater detail below. Further, one skilled in the relevant art will appreciate that additional routines may also be implemented to approximate color value within the present invention.

At block 210, transparency value for the pixel may be approximated. Similar to the color value, the pixel transparency value may be approximated by utilizing a selective transparency palette in accordance with the Gervautz and Purgthofer method. Additionally, in an alternate embodiment of the present invention, the pixel transparency value may be approximated by utilizing an optimized transparency palette. Examples of approximating data utilizing either the Gervautz and Purgthofer method or an optimized color palette will be described in greater detail below. However, for smaller amounts of transparency data, such as single 8-bit word, transparency palette optimization may not be required. In an alternative embodiment of the present invention, pixel transparency values may be approximated by truncating a portion of the transparency data. For example, 8-bit transparency data may be approximated to 4 bits by truncating the 4 least significant bits of the transparency data. Still further, in another alternate embodiment, the transparency value of the pixel is not approximated and the original transparency data may be used. For example, a test may be conducted to determine whether the number of bits allocated in the format for transparency values does not exceed the number of bits used to define the original transparency values. Alternatively, a predetermined system specification or a user control may be used to specify whether to approximate pixel transparency values. Accordingly, block 210 may be omitted.

At decision block 212, a test is conducted to determine whether additional pixels are to be processed. If so, the next pixel is obtained at block 214 and the routine 200 returns to block 208. If no pixels remain to be processed, at decision block 216, a test is conducted to determine whether any images in the display remain to be processed. If additional images remain, at block 218, the next image is obtained and routine 200 returns to block 206 to process the pixels of the next image. Once all of the images have been processed and no images remain, at block 220, the computer transmits the requested content utilizing the approximated pixel information and the routine 200 terminates at block 222.

Figure 4:
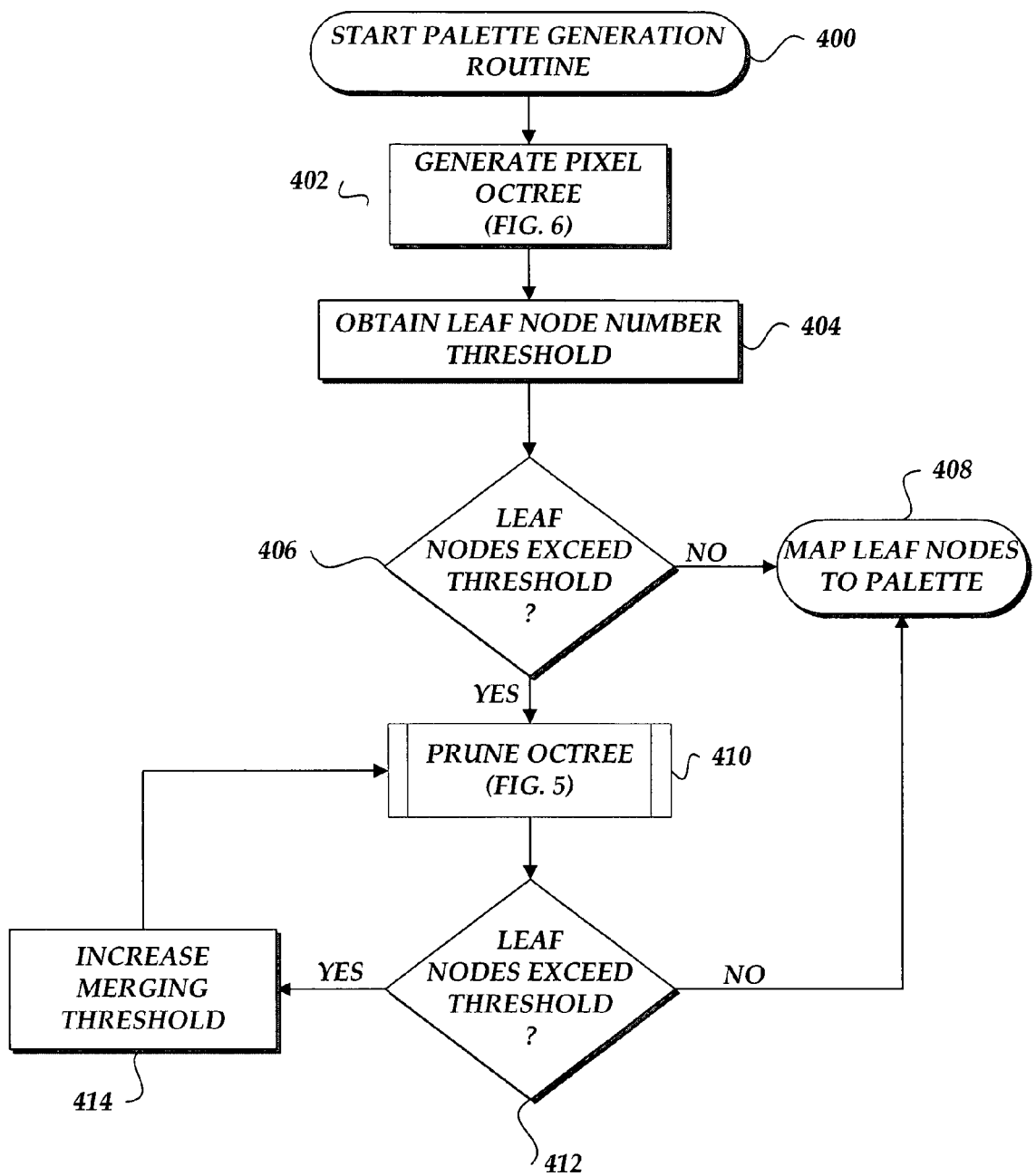
FIG. 4 is flow diagram illustrative of a palette generation routine in accordance with an aspect of the present invention.
Figure 5:
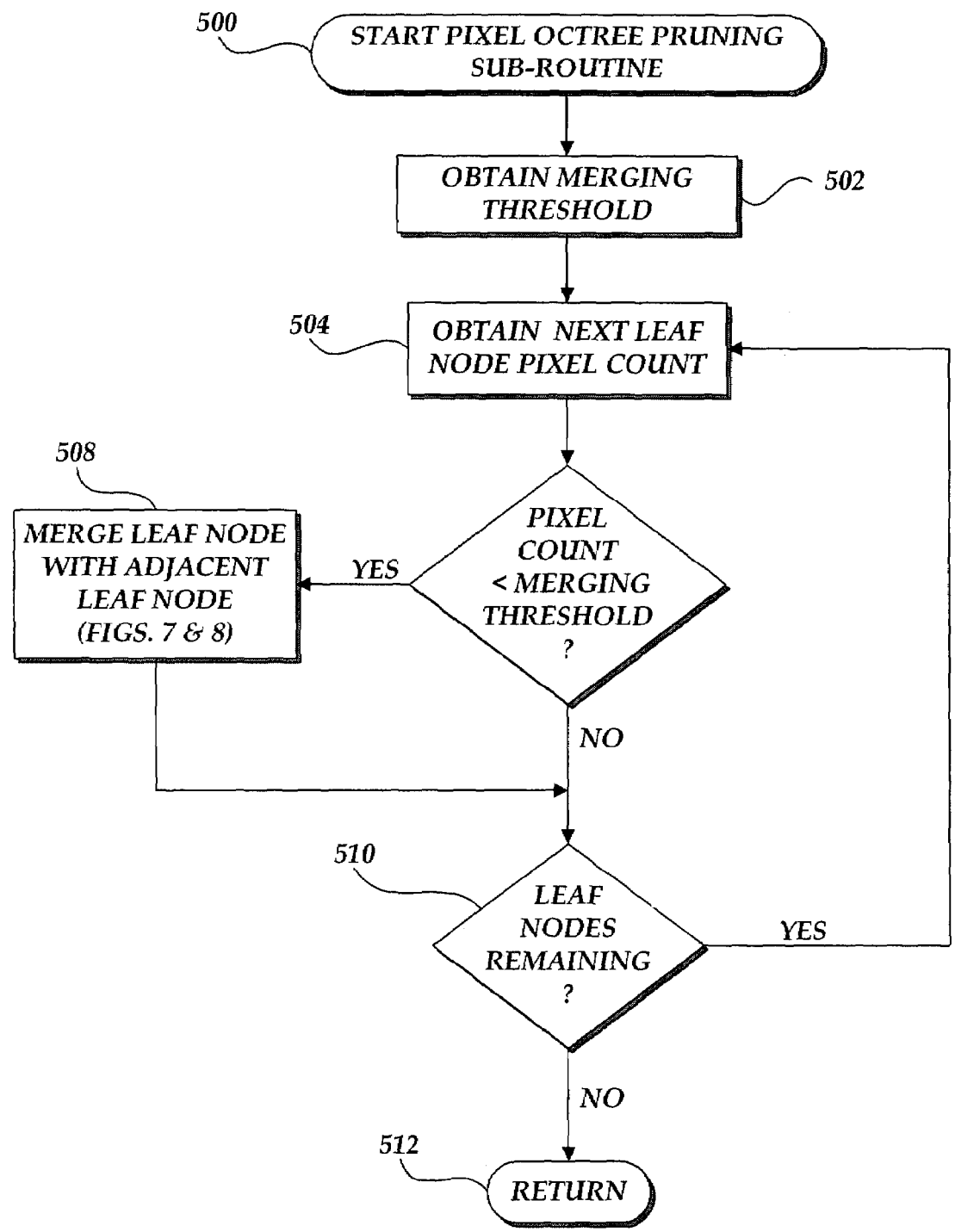
FIG. 5 is a flow diagram illustrative of an octree pruning sub-routine in accordance with an aspect of the present invention.

FIGS. 4 and 5 are flow diagrams illustrative of a palette optimization routine 400 and octree pruning sub-routine that may be utilized to optimize pixel color values or pixel transparency values ("display attributes") (blocks 208 and 210) in accordance with an embodiment of the present invention. One skilled in the relevant art will appreciate that routines 400 and 500 correspond to an implementation of the Gervautz and Purgthofer method. However, one skilled in the relevant art will appreciate that other implementations of the Gervautz and Purgthofer may be practiced with the present invention.

Figure 6:
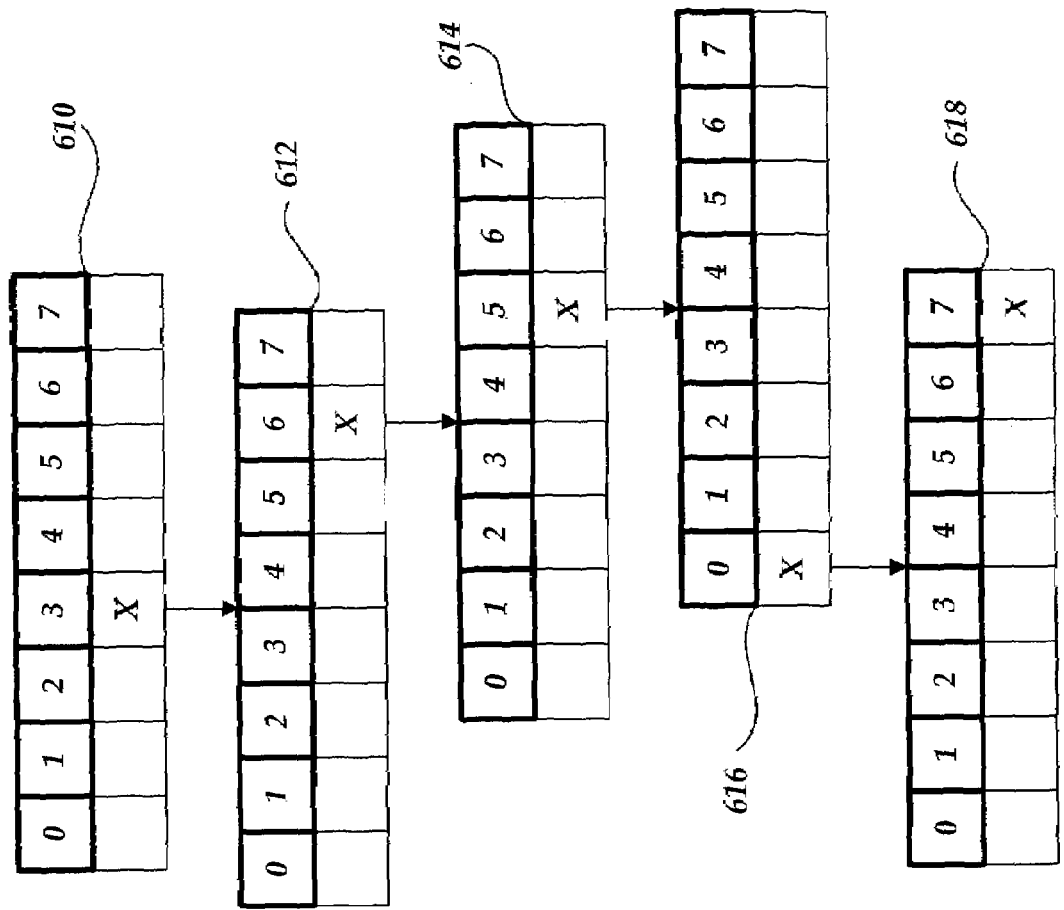
FIG. 6 is a block diagram illustrative of a mapping of pixel RGB values into a hierarchical octree structure in accordance with the present invention.
Figure 6:
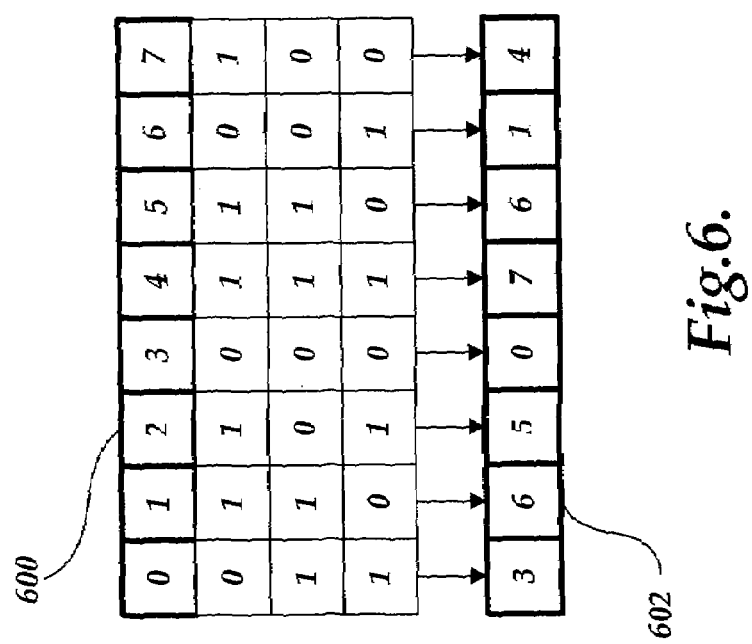

With reference to FIG. 4, at block 402, a pixel tree structure corresponding to the display attributes is generated. FIG. 6 is a block diagram illustrative of a mapping of pixel RGB values into a hierarchical tree structure, referred to as a color octree. Although FIG. 6 is illustrated with regard 24-bit pixel color values, one skilled in the relevant art will appreciate that it would also be applicable to pixel transparency values. In such an implementation, the mapping of 8-bit pixel transparency values would result in an eight level tree structure having two element arrays. With reference to FIG. 6, table 600 represents a single pixel's 8-bit RGB value denoted by rows 602, 604, and 606 respectively. Row 608 corresponds to a three-digit combination of each bit place of the RGB value, with the most significant bit on the left. Each bit place value in row 608 corresponds to the value tracked within a hierarchical octree from most significant bit to least significant bit, respectively. As illustrated in FIG. 6, because the most significant bit value in row 608 corresponds to the binary representation of the numeral "3," the value of the array element in octree array 610 is incremented by one. Similarly, because the second most significant bit value in row 608 corresponds to the binary representation of the number "6," the array element in octree array 612 is incremented by one. Note that array element 612 is linked to the previous tracked array element in array 610. For purposes of illustration, octree arrays 614, 616 and 618 are populated according to the next three most significant bits of row 608. Accordingly, the array elements of array element 618 (on the fifth level) are considered the leaf nodes of the octree. However, one skilled in the relevant art will understand that three additional octree arrays could be populated (now shown).

Returning to FIG. 4, at block 404, a leaf node number threshold corresponding to the number of unique attributes entries (e.g., color values or transparency values) with the attribute palette is obtained. In an illustrative embodiment of the present invention, the leaf node number threshold corresponds to the number of bits for the attribute defined in the data approximation format. Additionally, some portion of the attribute entries may be reserved for a subset of preselected attribute entries. At decision block 406, a test is conducted to determine whether the number of leaf nodes within the octree exceeds the leaf node number threshold. If the number of leaf nodes does not exceed the threshold, at block 408, the attribute entries defined by the leaf nodes are mapped to the attribute palette and the routine 400 terminates.

Alternatively, if the number of leaf nodes exceeds the threshold, the octree is pruned at block 410. A sub-routine for pruning the octree will be described in greater detail below. Thereafter, at decision block 412, a test is conducted to determine whether the number of leaf nodes within the octree exceeds the leaf node number threshold. If the number of leaf nodes does not exceed the threshold, at block 408, the attribute entries defined by the leaf nodes are mapped to the attribute palette and the routine 400 terminates. Alternatively, if the number of leaf nodes exceeds the threshold, the merging threshold is increased at block 414 and the routine 400 returns to block 410.

FIG. 5 is a flow diagram illustrative of a sub-routine 500 for pruning a tree structure, such as an octree, in accordance with the present invention. At block 502, the merging threshold is obtained. At block 504, an iterative process for processing all the leaf nodes in the octree begins by obtaining the next leaf node. At decision block 506, a test is conducted to determine whether pixel count corresponding to the leaf node is greater than the merging threshold. If the count is not greater, at block 408, the current leaf node is merged with an adjacent node. If the pixel count is greater than the merging threshold or after a leaf node has been merged, at decision block 510, a test is conducted to determine whether additional leaf nodes remaining. If so, the sub-routine 500 returns to block 504. If not, the sub-routine 512 returns.

Figure 7:
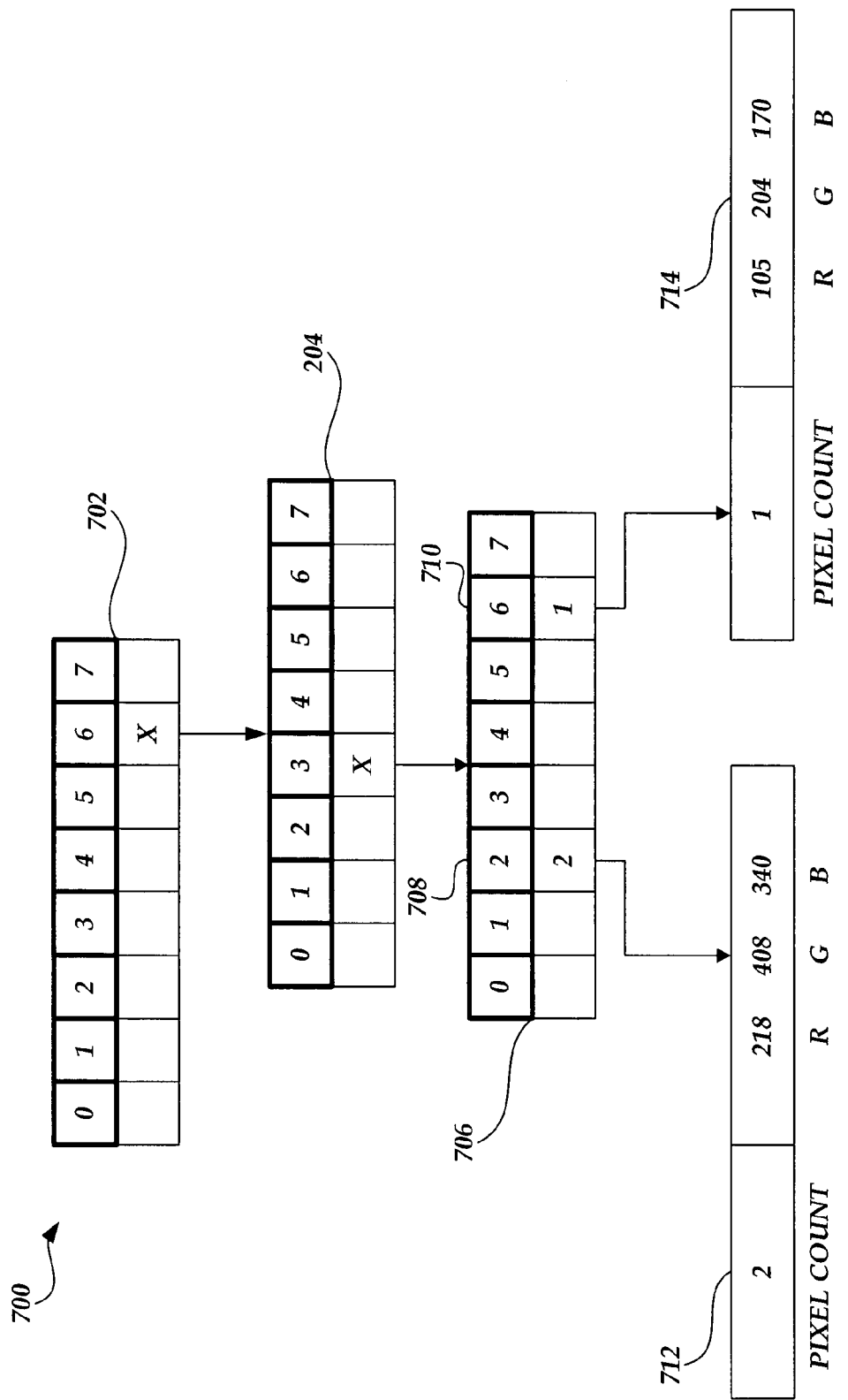
FIG. 7 is a block diagram illustrative of an octree that has been mapped in accordance with the present invention.
Figure 8:
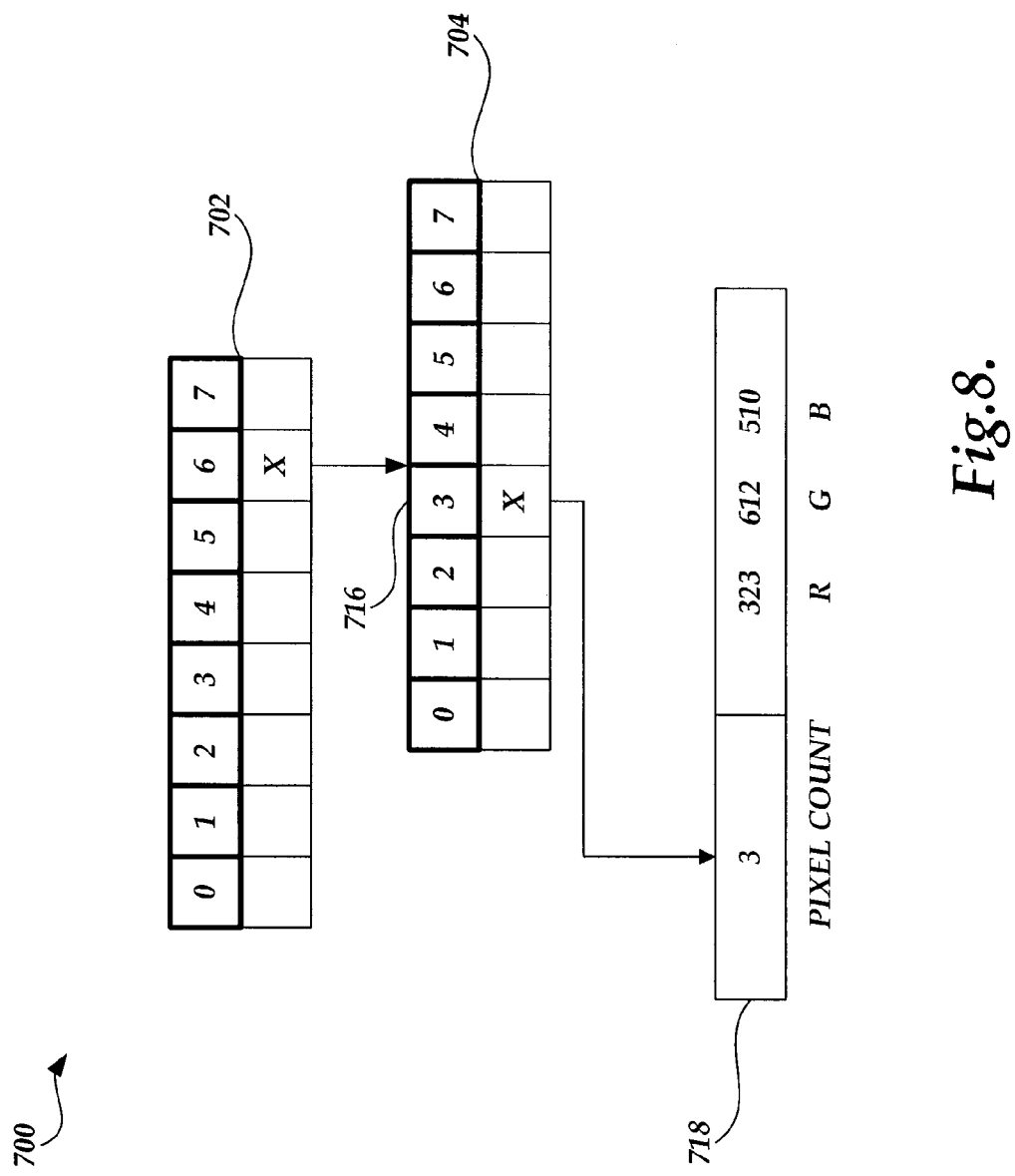
FIG. 8 is a block diagram of the octree of FIG. 7 illustrating the resulting merger of two array elements.

FIGS. 7 and 8 are block diagrams illustrative of an octree 700 that has been mapped and pruned in accordance with routines 400 and 500. As illustrated in FIG. 7, the octree 700 includes a number of levels of octree arrays, including octree arrays 702, 704 and 706, in which octree array 706 corresponds to a leaf node array. Octree array 706 includes a third array element 708 that includes pixel tracking information 712 of 2 pixels and the cumulative RGB information for the two pixels. Likewise, the octree array 706 includes a seventh array element 710 that includes pixel tracking information 714 of 1 pixel with it cumulative RGB information. Assuming that the pixel array element 710 is the lowest leaf node within the octree, array element 708 and array element 710 are merged up one level to form a new leaf node including all the pixel information.

With reference now to FIG. 8, array elements 708 and 710 of array 706 have been merged into array element 716 of array 704. Accordingly, array element 716 becomes a new leaf node of the octree and includes pixel-tracking information 718 corresponding to the cumulative RGB values of the previously merged array elements. The pixel tracking information 718 is then utilized to generate an averaged RGB values for the pixels previously found in each array.

FIGS. 9A and 9B and 10A and 10B are flow diagrams illustrative of a pixel octree processing routine 900 and pixel octree pruning sub-routine 1000 utilized to utilized to optimize pixel color values ("display attributes") (block 208) in accordance with another embodiment of the present invention. Although the method is described in some detail in the present application, a more detailed discussion of a method for optimizing display attribute octrees is described in co-pending and commonly assigned U.S. patent application Ser. No. 10/464,155, entitled SYSTEM AND METHOD FOR APPROXIMATING PIXEL COLOR UTILIZING AN OPTIMIZED OCTREE, which is hereby incorporated by reference herein.

Figure 9A:
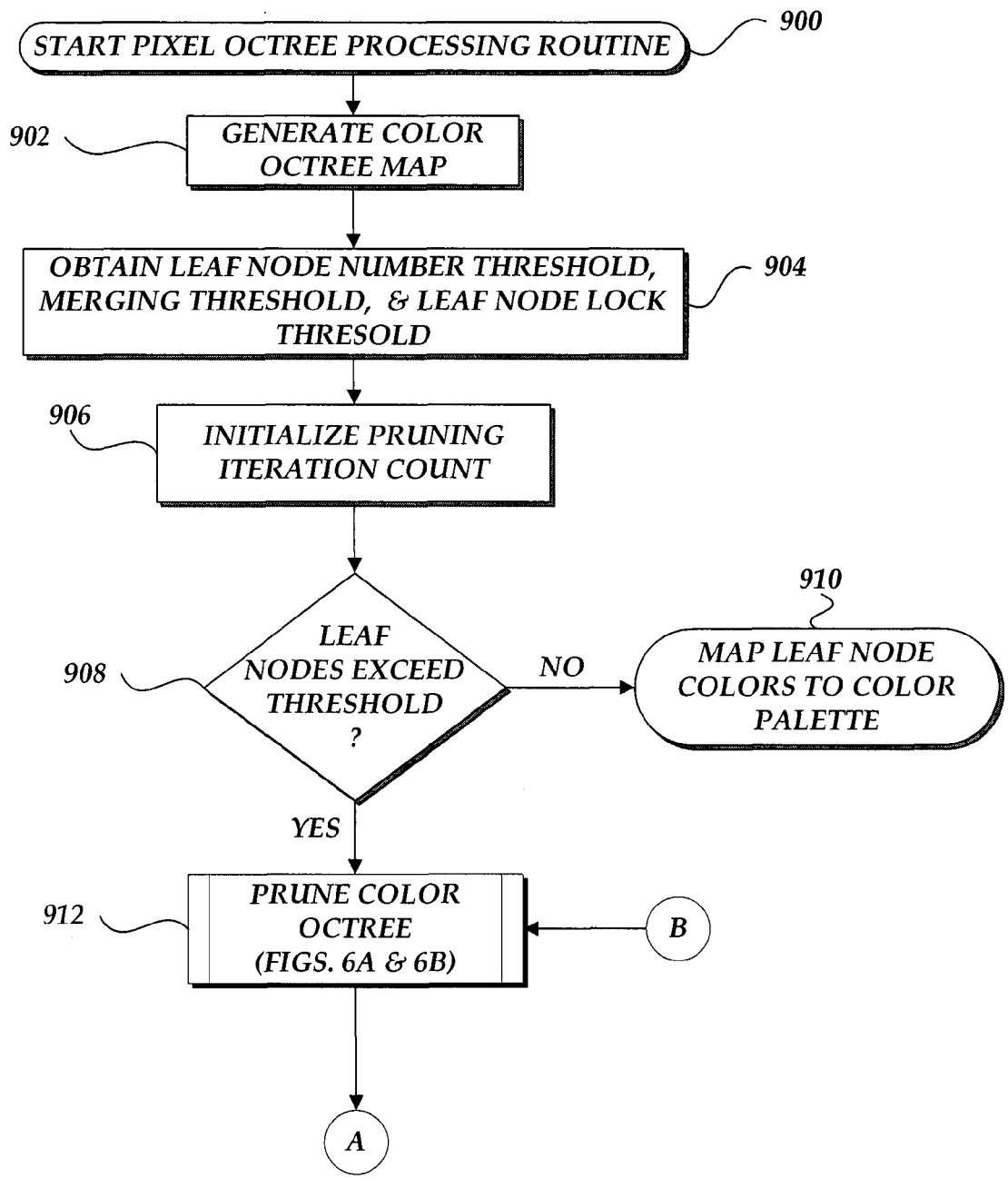
FIGS. 9A and 9B are flow diagrams illustrative of an octree processing routine utilized to generate an optimized display palette in accordance with the present invention.

With reference to FIG. 9A, at block 902, a pixel octree map is generated. As described above, the pixel octree map corresponds to the mapping of each individual pixel RGB values in a multi-level hierarchical octree. In one embodiment, the octree includes nine levels corresponding to the number of bits utilized to specify the RGB value of each pixel. Alternatively, the octree can include a lesser number of levels corresponding to an approximation of the lesser significant bits of the RGB values.

In an illustrative embodiment of the present invention, each node in the octree tracks the number of pixels passing through the node, the number of unique colors passing through the node and the cumulative RGB values for each of the pixels passing through the node. In one embodiment, the values tracked by each node correspond to the actual number of pixels passing through the node, the actual number of unique color passing through the node and actual cumulative RGB values for each of the pixels passing through the node. In another embodiment, additional criteria may be utilized to adjust the values tracked in each node according to a weighting schema. In one aspect, transparency values of each pixel can be used as a weighting function for the values tracked at each node. For example, a pixel transparency value corresponding to an opaque image would correspond to a value of "1", while a transparency value corresponding to transparency would correspond to "0". By multiplying each pixel's transparency value with its count number, opaque pixel values would have a greater impact on the count than transparent pixel values. For example, for a pixel of 50% transparency, the cumulative RGB value would only increase by 0.5*R, 0.5*G, 0.5*B and the cumulative count of pixels would only increase by 0.5. In another aspect, pixel location may be utilized as a weighting function for the values tracked at each node. For example, a pixel located on a center part of an image may be associated with a heavier weight that pixel on a periphery on an image. In still another aspect, each individual pixel may be assigned a weighting function based on input from the creator of the image or based upon display attributes of a device. For example, to facilitate facial recognition in images, pixels corresponding to the representation of a face may be given higher weight.

At block 904, a leaf node number threshold, leaf unique color lock threshold and merging threshold is obtained. The leaf node number threshold corresponds to the number of unique colors that may be included in the optimized color palette. For example, in an 8-bit color palette, 256 unique colors may be used. Accordingly, the leaf node number threshold could be set to 256. Alternatively, in an illustrative embodiment of the present invention, a portion of the colors may be pre-designated or reserved, thereby limiting the number of colors that can be added to the color palette. The unique color lock threshold corresponds to a number utilized to preserve distinct colors during the optimization process and serves as an secondary threshold that must be satisfied prior to merging leaf nodes. In accordance with an embodiment of the present invention, each level in the octree corresponds to a particular unique color lock threshold. In one embodiment, the unique color lock threshold may be fixed number. In another embodiment of the present invention, the unique color lock threshold can be dynamically modified based upon a mathematical evaluation of a color lock variable. The unique color lock threshold will be described in greater detail below. The merging threshold corresponds to the minimum number of pixels that a particular color leaf node should represent to avoid being merged with an adjacent node in the octree. As will be explained in greater detail below, the merging threshold corresponds to a number utilized to identify the minimum number of pixels that a leaf node may have to be pruned. In an illustrative embodiment of the present invention, the merging threshold is a dynamic number that is increased during iterations of routine 900.

At block 906, the pruning iteration count and the merging threshold are initialized. As will be described in greater detail below, the pruning iteration count corresponds to a number for tracking the number of times the octree has been pruned with the current unique color lock threshold. The pruning iteration count is used to determine when to adjust the unique color lock threshold.

At block 908, a test is conducted to determine whether the current number of leaf nodes in the octree exceeds the leaf node number threshold. If the leaf node number threshold is not exceeded, the unique leaf node colors can be mapped to the color palette at block 910 and the routine terminates. Alternatively, if the leaf node number threshold is exceeded, the pixel octree is pruned at block 912.

Figure 10A:
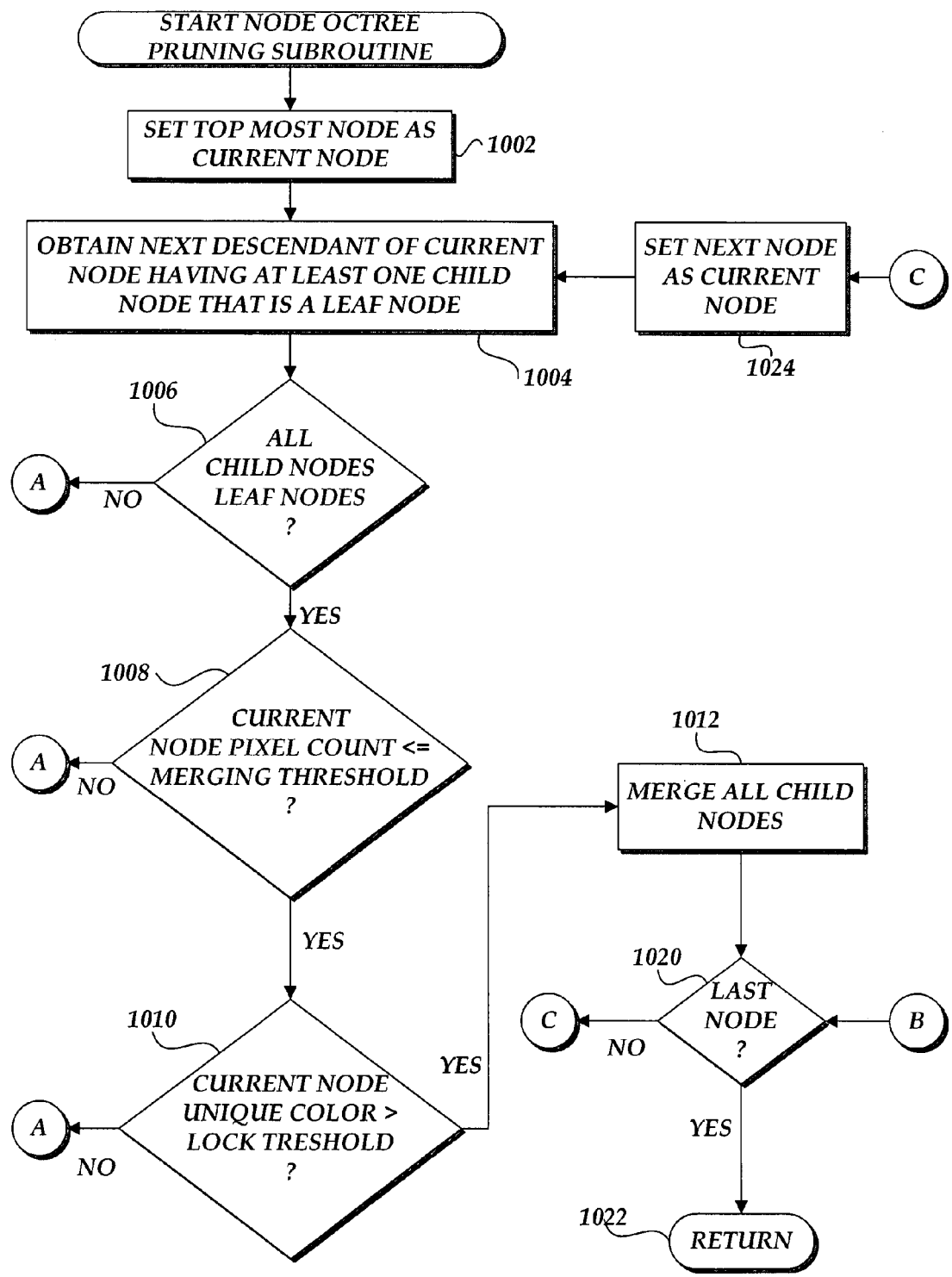
FIGS. 10A and 10B are flow diagrams illustrative of an octree pruning sub-routine in accordance with the present invention.
Figure 10B:
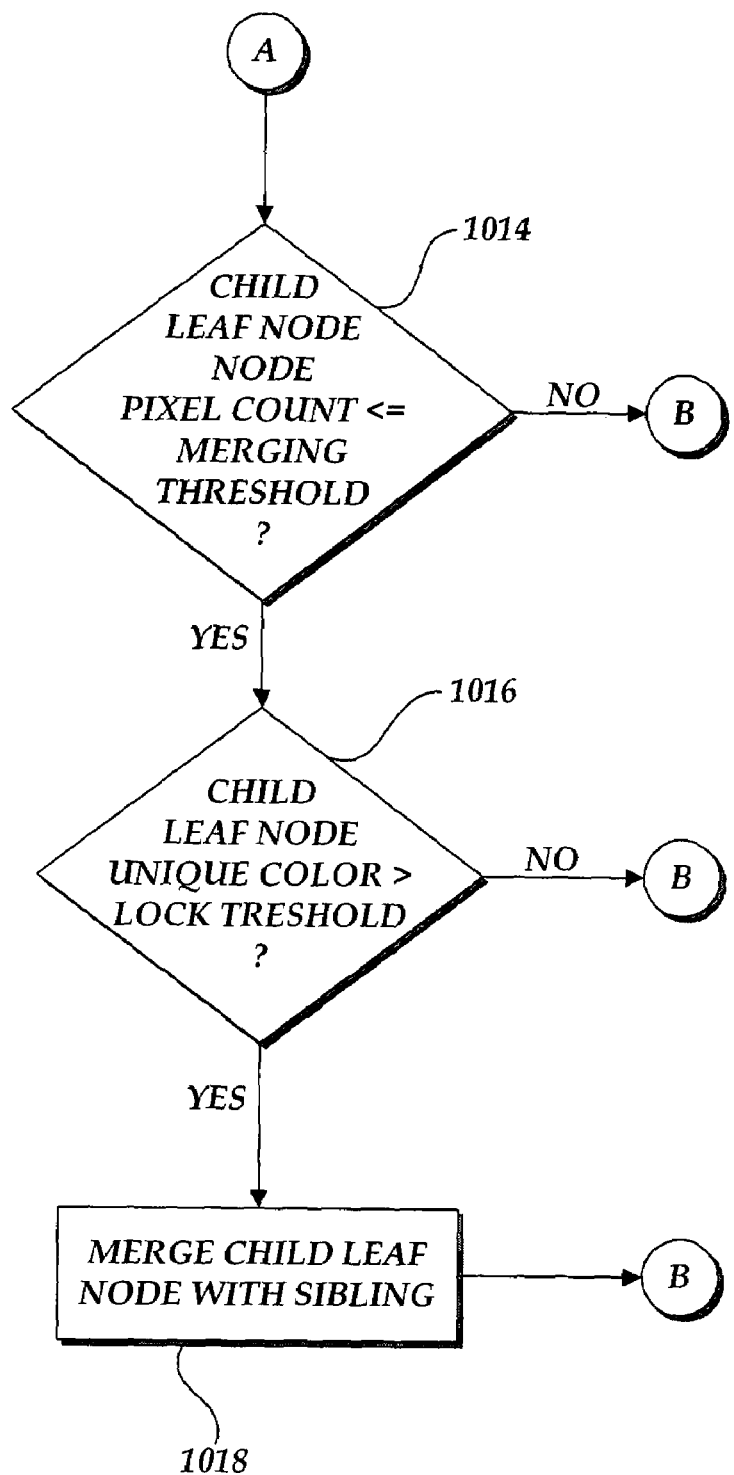

FIGS. 10A and 10B are flow diagrams illustrative of a pixel octree pruning sub-routine 1000 in accordance with the present invention. In an illustrative embodiment of the present invention, sub-routine 1000 represents a recursive process that begins by examining each node in the color octree through a depth-first analysis to reduce the number of leaf nodes in the octree. At block 1002, the top most node in the octree is set as the current node to be examined, referred to as the current node. At block 1004, the next descendant of the current node having at least one child node that is a leaf node is obtained. In an illustrative embodiment of the present invention, sub-routine 1000 recursively iterates from the top most level in the octree to the subsequent levels in the octree to identify the next child node with at least one child node that will be processed as explained below. One skilled in the relative art will appreciate that each recursion through a higher level of the octree will eventually be processed.

At decision block 1006, a test is conducted to determine whether the current node includes all child leaf nodes. If the current node has all child leaf nodes, at decision block 1008, a test is conducted to determine whether the current node's pixel count is less than or equal to the current merging threshold. As explained above, in an illustrative embodiment of the present invention, each node in the octree includes the number of pixels passing through the node (e.g., the pixel count). Accordingly, decision block 1008 is a straight mathematical comparison. In an alternative embodiment of the present invention, additional criteria may be utilized to provide a weighting function to the pixel count number.

If the current node's pixel count is not less than the current merging threshold, the sub-routine 1000 proceeds to decision block 1014 (FIG. 10B), which will be described below. If the current node's pixel count is less than the current merging threshold, at decision block 1010, a test is conducted to determine whether the current node's unique color count is greater than the unique color lock threshold. In an illustrative embodiment of the present invention, each node further includes a unique color lock threshold that corresponds to second threshold that attempts to preserve unique colors in the octree that would otherwise be merged. The unique color lock threshold may be a pre-selected number or a dynamically calculated number based upon an evaluation of a color lock variable.

Figure 11:
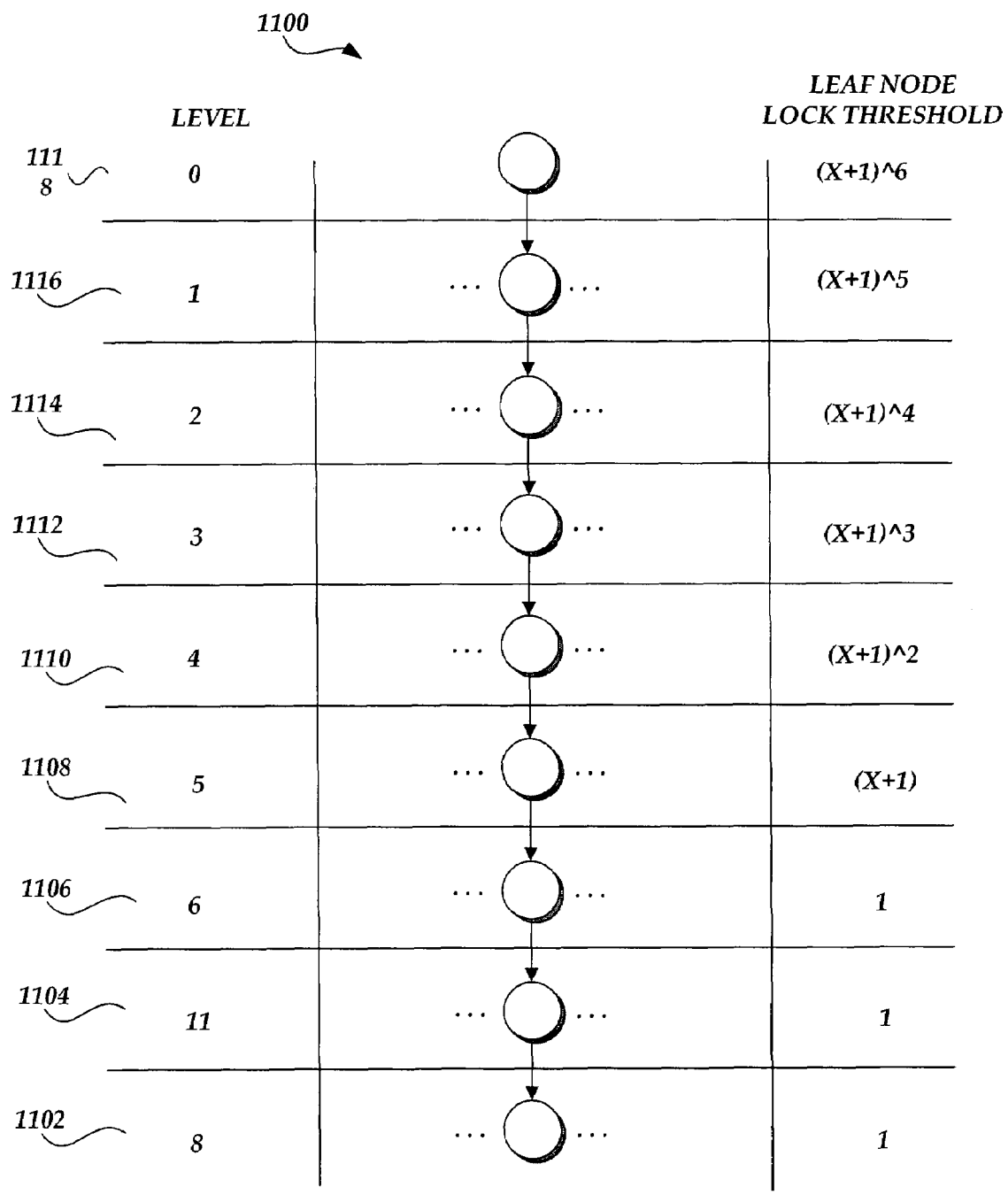
FIG. 11 is a block diagram illustrative of the leaf node lock threshold of a color octree according to a hierarchical level in accordance with the present invention.

FIG. 11 is block diagram the unique color lock threshold of various levels of a color octree 1100. As illustrated in FIG. 11, the lower levels of the octree 1102, 1104 and 1106 have fixed values for unique lock thresholds. The remaining levels of the octree 1106-718 include an exponential of a color lock variable. For example, a unique color lock threshold corresponding to the base node would be calculated by evaluating the color lock variable to the fifth power. Thus, each unique color lock threshold become exponentially higher as the level of the node in the octree increases. As illustrated in FIG. 11, the color lock variable can correspond to a range of numbers from 8 to 1 that is adjusting downward during various iterations of routine 900 and sub-routine 1000. Although FIG. 11 illustrates a combination of fixed values and dynamic values, one skilled in the relevant art will appreciate that all of the unique color lock thresholds may be predetermined fixed thresholds. Additionally, all of the unique color lock thresholds may be dynamically calculated by evaluating a color lock variable in a mathematical equation. Although a single mathematical equation is illustrated in FIG. 11, one skilled in the relevant art will appreciate that any number of mathematical equations may be utilized in accordance with the present invention.

Returning to FIG. 10A, if current node's unique color count is not greater than the color count threshold, the sub-routine 1000 proceeds to decision block 1014 (FIG. 10B), which will be described below. Alternatively, if current node's unique color count is greater than the color count threshold, at block 1012, all of the current node's children are merged into the current node and the routine 1000 proceeds to decision block 1018, which will be described in greater detail below.

Turning now to FIGURE 10B, if the current node does not have all child nodes (decision block 1006), does not have a pixel count less than or equal to the merging threshold (decision block 1008), or does not have a unique color count greater than the color count threshold (decision block 1010), at decision block 1014, a test is conducted to determine whether the child node's pixel count is less than or equal to the current merging threshold. If the child node's pixel count is less than the current merging threshold, at decision block 1016, a test is conducted to determine whether the child node's unique color count is greater than the color count threshold. If so, at block 1018, the child node is merged into a sibling node and the routine 1000 proceeds to decision block 1018, which will be described in greater detail below.

Returning to FIG. 10A, at decision block 1020, a test is conducted to determine whether the current node is the last node to be processed in the octree. If additional nodes remain, at block 1022, the next node is obtained and set as the current node. In an illustrative embodiment of the present invention, the next node selected will depend on the recursive traversal of the octree. As each child node is processed, the recursive process selects the child's parent, processes the parent again, and then selects any siblings to process. Accordingly, in an illustrative embodiment of the present invention, sub-routine 1000 starts with the top most node, traverses to the bottom most leaf nodes and then re-traverses back to the top most node. If no further nodes remain, at block 1024, sub-routine 1000 returns.

Figure 9B:
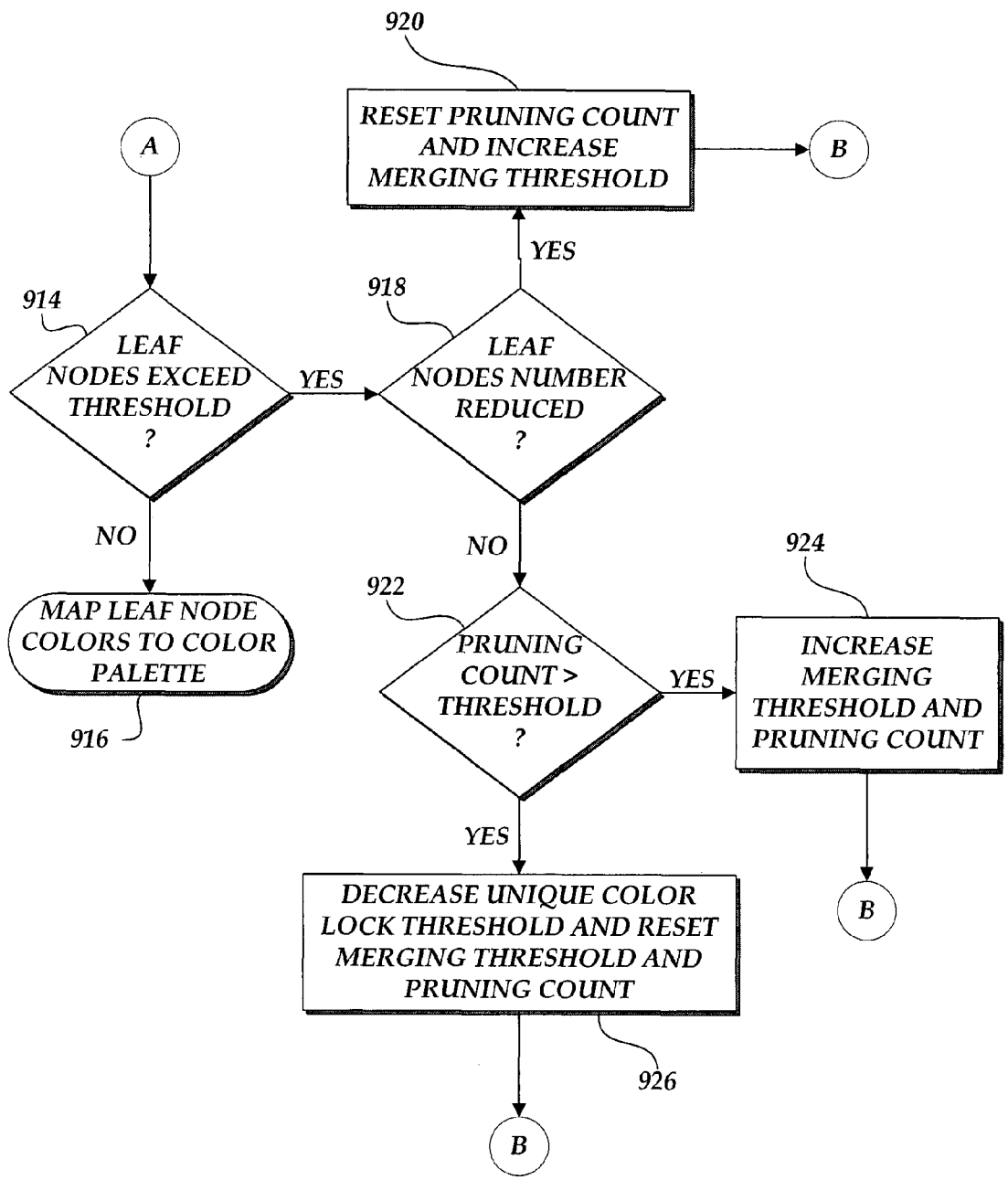

Turning now to FIG. 9B, once the pixel octree is pruned at block 912 (FIG. 9A), at decision block 914, a test is conducted to determine whether the number of leaf nodes exceeds the leaf node number threshold. If the leaf node number threshold is not exceeded, the unique leaf node colors can be mapped to the color palette at block 916 and the routine terminates. If the number of leaf nodes still exceeds the leaf node number threshold after the pruning, at decision block 918, a test is conducted to determine whether the number of leaf nodes has been reduced. If the number of leaf nodes has been reduced, at block 920, the pruning count is reset and the merging threshold is increased. The routine 900 returns to block 912 (FIG. 9A) to prune the octree again. In an illustrative embodiment of the present invention, because the merging threshold was successful in reducing the number of leaf nodes at the current unique color lock thresholds, the merging threshold will continue to be increased.

Alternatively, if the number leaf nodes was not reduced at decision block 918, at decision block 922, a test is conducted to determine whether the pruning count exceeds a pruning count threshold. In an illustrative embodiment of the present invention, the pruning count keeps track of the number of pruning iterations that have been conducted without a modification to the number of leaf nodes and will be utilized to determine when to adjust the unique color lock threshold. For example, in an illustrative embodiment of the present invention, the pruning count threshold may be set to ten pruning iterations. If the pruning count is below the pruning count threshold, at block 924, the merging threshold is increased and the pruning count is increased. In an illustrative embodiment of the present invention, the merging threshold may be incremented in pre-determined manner. The routine 900 returns to block 912 (FIG. 9A), where the pixel octree is pruned with the new merging thresholds. Returning to decision block 922, if the pruning count exceeds the threshold, at block 926, the unique color lock threshold is decreased and the merging threshold and pruning count are reset. The routine 900 returns to block 912 (FIG. 9A), where the pixel octree is pruned with the new merging and unique color lock thresholds. The routine 900 then continues until the number of leaf nodes is less than the leaf node number threshold.

In accordance with the present invention a receiving computer can render an image, or set of images, directly from the optimized data. In such an embodiment, the receiving computer stores the optimized display attribute data and renders the display images by mapping the pixel color from the optimized color palette. Further, the receiving computer can perform alpha blending directly from the appended transparency values if the transparency values are original or truncated or by mapping transparency values from a transparency palette if they are optimized.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A method for processing content requests, the method comprising:
   obtaining a content request including a request for display data corresponding to a specification of color values and transparency values for a plurality of pixels, wherein each pixel has a specific color value and a specific transparency value, the specific color value and the specific transparency values defined by a number of bits of data, and wherein a format for a response to the content requests corresponds to a number of bits of data for color values and a number of bits of data for transparency values;
   generating a color palette corresponding to a selection of a subset of pixel color values found in the plurality of pixels within the requested display data, wherein a size of the color palette is determined by the number of bits for color values in the format for the response to the content request;
   for each pixel in the display, mapping an original pixel color value to a color value in the color palette;
   if the number of bits defining an original pixel transparency value is less than or equal to the number of bits for transparency values in the format for the response to the content request, appending the original transparency values to the mapping of pixel color values for each pixel in the display; and
   transmitting the color palette and the mapped color values and transparency values in response to the content request.

2. The method as recited in claim 1, wherein the format of a response to the content request is dynamically determined, the method further comprising transmitting the format of a response to the content request with the color palette and the color and transparency values.

3. The method as recited in claim 2, wherein the format is automatically determined by processing criteria associated with the content request.

4. The method as recited in claim 1, wherein generating a color palette corresponding to a selection of a subset of pixel color values found in the plurality of pixels within the requested display data includes:
   generating a color octree corresponding to a mapping of pixel colors, wherein the color octree has a plurality of leaf nodes tracking a cumulative color value for a plurality of pixels in the display data;
   for each leaf node in the color octree, determining whether the number of pixels tracked in the leaf node exceeds a merging threshold;
   if the number of number of pixels tracked in the leaf nodes does not exceed the merging threshold, merging the leaf node with an adjacent leaf node in the color octree;
   increasing the merging threshold and processing each leaf node with the increased merging threshold; and
   if the number of leaf nodes is less than or equal to the size of the color palette, generating a color palette corresponding to a mapping each remaining leaf node color value.

5. The method as recited in claim 1, wherein generating a color palette corresponding to a selection of a subset of pixel color values found in the plurality of pixels within the requested display data includes:
   (a) generating a color octree corresponding to a mapping of pixel color values, wherein the color octree includes a plurality of leaf nodes tracking a cumulative color value for a plurality of pixels in the display and wherein each leaf node includes a leaf node lock threshold corresponding to its position within the color octree;
   (b) for each leaf node in the color octree, determining whether the number of pixels tracked by the leaf node is less than a merging threshold;
   (c) if a number of pixels tracked by the leaf node is less than a merging threshold, determining whether a number of unique colors represented by a direct child of a common parent node is greater than a leaf node lock threshold;
   (d) if the number of unique colors represented by a direct child of a common parent node is greater than a leaf node lock threshold corresponding to the direct child, merging the leaf node with an adjacent node in the color octree;
   (e) if the number of remaining leaf nodes is greater than the size of the color palette, increasing the merging threshold and a merging threshold count and repeating (a)–(d) until the merging threshold count is greater than a count threshold;
   (f) adjusting the leaf node lock threshold and resetting the merging threshold and repeating (a)–(e) until the merging threshold count is greater than a count threshold; and
   (g) if the number of leaf nodes is less than or equal to the size of the color palette, generating a color palette corresponding to a mapping each remaining leaf node color value.

6. The method as recited in claim 1 further comprising if the number of bits defining an original pixel transparency value is greater than the number of bits for transparency values in the format for the response to the content request, optimizing the original transparency value.

7. The method as recited in claim 6, wherein optimizing the original transparency value includes truncating one or more bits from the original transparency values.

8. The method as recited in claim 6, wherein optimizing the original transparency values includes:

generating a transparency palette corresponding to a selection of a subset of pixel transparency values found in the plurality of pixels within the requested display data, wherein a size of the transparency palette is determined by the number of bits for transparency values in the format for the response to the content request;

for each pixel in the display, mapping an original pixel transparency value to a transparency value in the color palette; and appending the mapped transparency value to the mapped color value for each pixel.

9. The method as recited in claim 6, wherein optimizing the original transparency value includes truncating one or more bits from the original transparency values.

10. The method as recited in claim 6, wherein optimizing the original transparency values includes:

generating a transparency palette corresponding to a selection of a subset of pixel transparency values found in the plurality of pixels within the requested display data, wherein a size of the transparency palette is determined by the number of bits for transparency values in the format for the response to the content request;

for each pixel in the display, mapping an original pixel transparency value to a transparency value in the color palette; and appending the mapped transparency value to the mapped color value for each pixel.

11. The method as recited in claim 1, wherein original pixel color and transparency values correspond to 32 bits.

12. The method as recited in claim 1, wherein the requested display data corresponds to a plurality of overlapping images, the method further comprising repeating (b)–(d) for each image in the plurality of overlapping images.

13. A computer-readable medium having a stored computer executable instructions for performing the method recited in claim 1.

14. A method for processing content requests corresponding to complex displays including a plurality of images, wherein at least a portion of the two or more images overlap, the method comprising:

for each image in a complex display, obtaining a specification of color values and transparency values for a plurality of pixels in the image, wherein each pixel has a specific color value and a specific transparency value, the specific color value and the specific transparency values defined by a number of bits of data;

generating a color palette corresponding to a selection of a subset of pixel color values found in the plurality of pixels within the requested display data, wherein a size of the color palette is determined by the number of bits for color values defined in a format for the response to the content request;

for each pixel in the display, mapping an original pixel color value to a color value in the color palette;

if the number of bits defining an original pixel transparency value is less than or equal to a number of bits for transparency values in a format for the response to the content request, appending the original transparency values to the mapping of pixel color values for each pixel in the display; and transmitting the color palette and the mapped color values and transparency values for each image in the two or more images in response to the content request, wherein the complex image is rendered directly from the mapped color values and transparency values without recreating the two or more images.

15. The method as recited in claim 14, wherein the format of a response to the content request is dynamically determined, the method further comprising transmitting the format of a response to the content request with the transmission of the color palette and the color and transparency values.

16. The method as recited in claim 15, wherein the format is automatically determined by processing criteria associated with the content request.

17. The method as recited in claim 14, wherein generating a color palette corresponding to a selection of a subset of pixel color values found in the plurality of pixels within the requested display data includes:

generating a color octree corresponding to a mapping of pixel colors, wherein the color octree has a plurality of leaf nodes tracking a cumulative color value for a plurality of pixels in the display data;

for each leaf node in the color octree, determining whether the number of pixels tracked in the leaf node exceeds a merging threshold;

if the number of number of pixels tracked in the leaf nodes does not exceed the merging threshold, merging the leaf node with an adjacent leaf node in the color octree;

increasing the merging threshold and processing each leaf node with the increased merging threshold; and if the number of leaf nodes is less than or equal to the size of the color palette, generating a color palette corresponding to a mapping each remaining leaf node color value.

18. The method as recited in claim 14, wherein generating a color palette corresponding to a selection of a subset of pixel color values found in the plurality of pixels within the requested display data includes:

(a) generating a color octree corresponding to a mapping of pixel color values, wherein the color octree includes a plurality of leaf nodes tracking a cumulative color value for a plurality of pixels in the display and wherein each leaf node includes a leaf node lock threshold corresponding to its position within the color octree;

(b) for each leaf node in the color octree, determining whether the number of pixels tracked by the leaf node is less than a merging threshold;

(c) if a number of pixels tracked by the leaf node is less than a merging threshold, determining whether a number of unique colors represented by a direct child of a common parent node is greater than a leaf node lock threshold corresponding to the direct child;

(d) if the number of unique colors represented by a direct child of a common parent node is greater than a leaf node lock threshold corresponding to the direct child, merging the leaf node with an adjacent node in the color octree;

(e) if the number of remaining leaf nodes is greater than the size of the color palette, increasing the merging threshold and a merging threshold count and repeating (a)–(d) until the merging threshold count is greater than a count threshold;

(f) adjusting the leaf node lock threshold and resetting the merging threshold and repeating (a)–(e) until the merging threshold count is greater than a count threshold; and (g) if the number of leaf nodes is less than or equal to the size of the color palette, generating a color palette corresponding to a mapping each remaining leaf node color value.

19. The method as recited in claim 14 further comprising if the number of bits defining an original pixel transparency value is greater than the number of bits for transparency values in the format for the response to the content request, optimizing the original transparency value.

20. The method as recited in claim 14, wherein original pixel color and transparency values correspond to 32 bits.

21. A computer-readable medium having a stored computer executable instructions for performing the method recited in claim 14.

22. A computer-readable medium having a stored computer-executable components for approximating pixel display properties, the computer-executable components comprising:
- a display format component for allocating a number of bits to approximate pixel color values for each pixel in a display and a number of bits to approximate pixel transparency values for each pixel in a display;
- a plurality of pixel color value components defining a pixel color value for each pixel in the display, wherein the pixel color value in the pixel color value components corresponds to a mapping of an original pixel color value to a color palette, wherein the color palette includes a subset of the original pixel colors in the display and wherein a size of the color palette is defined by the number of bits allocated to approximate pixel color; and
- a plurality of transparency value components defining a pixel transparency value for each pixel in the display, wherein the transparency value in the transparency value components corresponds to an original pixel transparency value if the number of bits utilized to define the pixel transparency values is less than or equal to the number of bits defined to approximate pixel transparency;
- wherein the plurality of pixel color value components and plurality of transparency value components are directly rendered to reproduce an image on a display.

23. The computer-readable medium as recited in claim 22, wherein the transparency values in the plurality of transparency value components correspond to a mapping of the original pixel transparency value to a transparency palette, wherein the transparency palette includes a subset of original pixel transparency values in the display and wherein a size of the transparency palette is defined by the number of bits allocated to approximate pixel transparency.

24. The computer-readable medium as recited in claim 22, wherein the number of bits to approximate pixel color and transparency values in the display format component is dynamically allocated.

25. The computer-readable medium as recited in claim 22, wherein the pixel color value components and the pixel transparency value components are organized by pixel and wherein the display format component further defines an order for the pixel color value and transparency value components.

26. The computer-readable medium as recited in claim 25, wherein the pixel color value component is severable from the pixel transparency value component for each pixel.

* * * * *